United States Patent
Bell et al.

(10) Patent No.: US 11,326,666 B2
(45) Date of Patent: *May 10, 2022

(54) LOW-PIM ROD RECEIVER ANGLE ADAPTERS AND CABLE HANGER ASSEMBLIES

(71) Applicant: ConcealFab Corporation, Colorado Springs, CO (US)

(72) Inventors: Thomas Bell, Colorado Springs, CO (US); Steve Rogers, Colorado Springs, CO (US); Jacob Lovelady, Colorado Springs, CO (US)

(73) Assignee: ConcealFab Corporation, Colorado Springs, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/188,965

(22) Filed: Mar. 1, 2021

(65) Prior Publication Data

US 2021/0207683 A1 Jul. 8, 2021

Related U.S. Application Data

(62) Division of application No. 16/856,802, filed on Apr. 23, 2020, now Pat. No. 10,935,105.

(Continued)

(51) Int. Cl.
  *H02G 3/32* (2006.01)
  *F16G 11/12* (2006.01)
  (Continued)

(52) U.S. Cl.
  CPC ............ *F16G 11/12* (2013.01); *F16G 11/025* (2013.01); *F16L 3/221* (2013.01); *H02G 1/08* (2013.01);
  (Continued)

(58) Field of Classification Search
  CPC .. H02G 3/32; H02G 3/24; H02G 7/205; F16L 3/221
  (Continued)

(56) References Cited

U.S. PATENT DOCUMENTS

| 1,840,216 | A | * | 1/1932 | Tormo | ...................... F16L 3/24 248/72 |
| 2,663,531 | A | * | 12/1953 | Rubano | .................. A47B 97/04 248/229.17 |

(Continued)

*Primary Examiner* — Bradley Duckworth
(74) *Attorney, Agent, or Firm* — Mehrman Law Office; Michael J. Mehrman

(57) ABSTRACT

A low passive intermodulation (PIM) angle adapter fabricated from or coated with a polymeric material supports one or more cable support hangers. The low-PIM angle adapter includes a box frame integrally formed with a slot frame, where the box frame supports one or more cable hangers and the slot frame slides onto a support structure to position the angle adapter on the support structure. The low-PIM angle adapter also includes one or more cable tie slots the receive cable ties that secure the angle adapter to the support structure. Various embodiments include differently shaped box frames designed to support one or more cable hangers, such hex, rectangular, trapezoidal and square box frames. The box frames may include multiple receptacles for receiving multiple cable hangers. Cable blocks and brackets also may be used to connect multiple cable hangers to a single receptacle of the low-PIM angle adapter.

20 Claims, 14 Drawing Sheets

Related U.S. Application Data

(60) Provisional application No. 62/930,712, filed on Nov. 5, 2019, provisional application No. 62/837,365, filed on Apr. 23, 2019.

(51) Int. Cl.
*F16G 11/02* (2006.01)
*H02G 1/08* (2006.01)
*H02G 3/30* (2006.01)
*F16L 3/22* (2006.01)

(52) U.S. Cl.
CPC ................ *H02G 3/24* (2013.01); *H02G 3/30* (2013.01); *H02G 3/32* (2013.01)

(58) Field of Classification Search
USPC ............................................ 248/72
See application file for complete search history.

(56) References Cited

U.S. PATENT DOCUMENTS

| | | | | |
|---|---|---|---|---|
| RE24,127 E * | 3/1956 | Binns et al. | ........... | H01B 17/16 174/163 F |
| 3,012,750 A * | 12/1961 | Schermerhorn, Jr. | . | A47B 57/56 248/230.9 |
| 7,090,174 B2 * | 8/2006 | Korczak | ............... | F16B 37/045 248/61 |
| 8,191,836 B2 * | 6/2012 | Korczak | ................... | H02G 3/30 248/68.1 |
| 10,096,934 B1 * | 10/2018 | Desjardins | ......... | H01R 13/5841 |
| 10,415,723 B2 * | 9/2019 | Vaccaro | ................... | F16L 3/00 |
| D879,782 S * | 3/2020 | Bell | ............................ | D14/433 |
| D879,783 S * | 3/2020 | Bell | ............................ | D14/433 |
| D879,784 S * | 3/2020 | Bell | ............................ | D14/433 |
| D879,786 S * | 3/2020 | Bell | ............................ | D14/433 |
| 10,627,016 B2 * | 4/2020 | Vaccaro | ................... | F16L 3/221 |
| 10,637,226 B2 * | 4/2020 | Bell | ........................ | H02G 3/32 |
| D890,182 S * | 7/2020 | Bell | ............................ | D14/433 |
| 10,724,655 B2 * | 7/2020 | Bell | ........................ | F16L 3/1222 |
| 10,734,719 B1 * | 8/2020 | Bell | ........................ | H01Q 1/52 |
| 10,935,105 B2 * | 3/2021 | Bell | ........................ | H02G 1/08 |
| 11,081,786 B2 * | 8/2021 | Bell | ........................ | H01Q 1/246 |
| 2005/0023421 A1 * | 2/2005 | Wood | ........................ | F16L 3/24 248/226.11 |
| 2006/0249633 A1 * | 11/2006 | Korczak | ................... | F16L 3/24 248/62 |
| 2012/0292460 A1 * | 11/2012 | Hsu | ........................ | H02G 7/053 248/70 |
| 2017/0244233 A1 * | 8/2017 | Hsu | ........................ | H01R 13/72 |
| 2019/0383426 A1 * | 12/2019 | Vaccaro | ................... | F16B 21/088 |
| 2019/0390797 A1 * | 12/2019 | Bell | ........................ | H02G 3/32 |
| 2020/0003338 A1 * | 1/2020 | Vaccaro | ................... | H01Q 1/12 |
| 2020/0109800 A1 * | 4/2020 | Bell | ........................ | F16L 3/221 |
| 2020/0185899 A1 * | 6/2020 | Leng | ........................ | F16L 3/13 |
| 2020/0208757 A1 * | 7/2020 | Joshi | ........................ | F16G 11/10 |
| 2020/0256483 A1 * | 8/2020 | Joshi | ........................ | F16L 3/222 |

* cited by examiner

LOW-PIM ROD RECEIVER ANGLE ADAPTERS AND CABLE HANGER ASSEMBLIES

REFERENCE TO RELATED APPLICATIONS

This is a divisional application claiming priority to U.S. patent application Ser. No. 16/856,802 (U.S. Pat. No. 10,935,105), which claims priority to U.S. Provisional Patent Application Ser. Nos. 62/837,365 filed 23 Apr. 2019, 62/930,712 filed 5 Nov. 2019, and 62/930,734 filed 5 Nov. 2019, which are all incorporated by reference.

TECHNICAL FIELD

The present invention is directed to cellular communication systems and, more particularly, to polymeric angle adapters and associated cabler hanger assemblies used to reduce passive intermodulation interference (PIM) at cellular telephone base station antenna sites.

BACKGROUND

An essential element of modern mobile communications systems is the "cell site." The cell site includes one or more cellular base station antennas aimed at a desired geographical area of coverage with coaxial cables connecting the antennas to base station radio equipment. The performance of a cell site is often limited by passive intermodulation ("PIM") interference. PIM interference occurs when the high-power downlink signals (the "main beam") transmitted by the base station antenna mixes at passive, non-linear junctions in the RF path, creating new signals. When these new signals (intermodulation products) fall in an antenna's uplink band, they act as interference and reduce the signal-to-interference-plus-noise ratio ("SINR"). As the SINR reduces, the geographic coverage of the cell site reduces and the data capacity of that cell site reduces.

It is well documented that loosely touching metal-to-metal surfaces can behave in a non-linear fashion and become sources of passive intermodulation when illuminated by high power RF signals. Recently, it has been determined that loose metal-to-metal connections located behind base station antennas are also able to generate high levels of passive intermodulation. Even though this region is well outside the main beam of the antenna, enough RF energy is present in this region to excite non-linear objects and generate PIM.

Metal brackets and associated hardware for supporting RF, optical, ground and remote electrical tilt ("RET") cable are common sources of loose metal-to-metal contact found in the region behind and close to base station antennas. These cables are secured by cable hangers spaced along their length to the antenna support frame to prevent the cables from moving in the wind. Antenna support frames are often constructed using structural steel angle supports and metal cable hangers used to secure the cables to the frame. For example, FIG. 1 is a side view and FIG. 2 is a perspective view of a conventional cable hanger assembly 10, which includes a metal cable hanger 11 that supports a cable 12 that is routed through the cable hanger. The cable hanger 11 is connected to a "U" shaped metal angle adapter 13, which is connected to a metal support structure 14, such as an angle support or flange forming part of the antenna support frame. The "U" shaped angle adapter 13 includes a receptacle hole, typically 0.75-inch in diameter, that accepts the snap-in type cable hanger 11. The angle adapter 13 is typically fabricated from stainless-steel with serrated teeth 15 on one side and a threaded hole on the opposite side. A set screw 16 is installed into the threaded hole and, when tightened, drives the end of the set screw into one side of the support structure 14. This in turn drives the serrated teeth into the opposite side of the support structure 14.

Multiple sources of passive intermodulation are present with this conventional cable hanger assembly 10. First, the set screw 16 used to secure the angle adapter 13 to the support structure 14 may not be tightened sufficiently or loosen over time, which can cause PIM to be generated at the loose metal-to-metal contact between the angle adapter and a support structure. Second, even if tightened sufficiently, there is potential for PIM generation at the corner of the U" shaped angle adapter 13 and where the serrated teeth 15 touch the support structure 14. Third, the angle adapter 13 and the set screw are usually constructed from stainless-steel while the support structure 14 is usually constructed from galvanized steel. Galvanized steel and stainless steel are dissimilar metals at opposite ends of the galvanic series. This causes small pockets of corrosion to form over time where the serrated teeth 15 of the angle adapter 13 and the end of the set screw 16 dig into the galvanized steel support structure 14, which creates another potential source of PIM generation.

A reliable, inexpensive, and easy to deploy cable support solution is therefore needed to secure coaxial cables to galvanized steel support structures in close proximity to base station antennas to mitigate PIM generation.

SUMMARY

The needs described above are met by low-PIM angle adapters and associated cable hanger assemblies formed from or coated with a polymeric material used to secure coaxial cables in the potential PIM reactive zone behind cellular base station antennas. In an illustrative embodiment, a low-PIM cable angle adapter includes a box frame integrally formed with a slot frame fabricated from or coated with a polymeric material. The box frame defines one or more receptacles for supporting one or more cable hangers, and the slot frame defines one or more slots for positioning the angle adapter on a support structure. The angle adapter also includes one or more slots for receiving one or more cable ties for securing the angle adapter to the support structure.

In an illustrative embodiment, the low-PIM angle adapter includes a rod receiver leading to an internal hex socket for capturing a hex bolt head or nut engaged with the rod. An external hex profile for receiving a wrench facilitates tightening a compression nut threaded on the rod with a portion of the angle adapter secured between the compression nut and the bolt or nut captured in the hex socket. A representative cable hanger assembly includes a polymeric cable block type cable hanger secured on the rod, which may be adjacent to the angle adapter or spaced apart on the rod from the angle adapter. Another embodiment includes a bracket secured to the rod and one or more cable hangers carried by the bracket. In additional embodiments, the box frame includes a rectangular box frame defining one receptacle for receiving one snap-in style cable hanger, a trapezoidal box frame defining three receptacles for receiving respective snap-in style cable hangers, a square box frame defining three receptacles for receiving respective snap-in style cable hangers. Cable blocks and brackets also may be used to connect multiple cable hangers to a single receptacle of the low-PIM angle adapter.

It will be understood that specific embodiments may include a variety of features in different combinations, as desired by different users. The specific techniques and systems for implementing particular embodiments of the invention and accomplishing the associated advantages will become apparent from the following detailed description of the embodiments and the appended drawings and claims.

BRIEF DESCRIPTION OF THE FIGURES

The numerous advantages of the embodiments of the invention may be better understood with reference to the accompanying figures.

DETAILED DESCRIPTION

Figure 1:
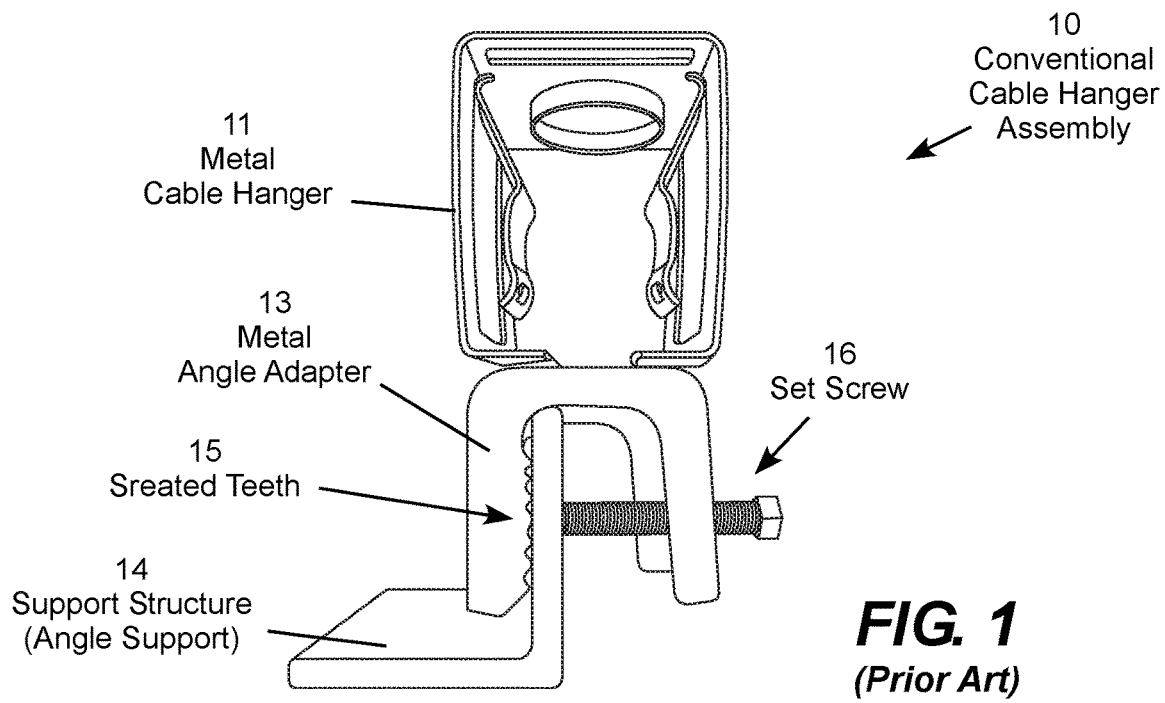
FIG. 1 is a side view of a conventional cable hanger assembly.
Figure 2:
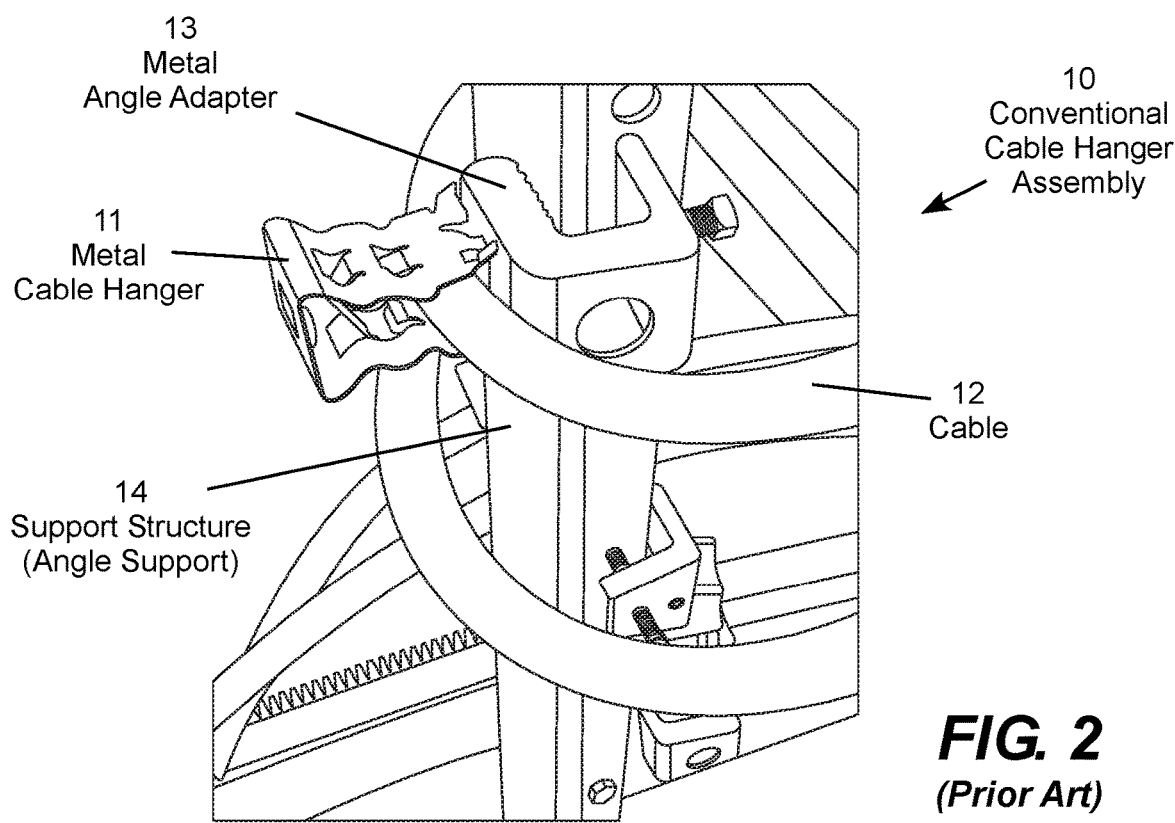
FIG. 2 is a perspective view of the conventional cable hanger assembly installed on a support structure at a cellular telephone base station antenna site.

Embodiments of the invention may be embodied in low passive intermodulation (PIM) angle adapters and associated cable hanger assemblies that support one or more cable hangers. The innovative angle adapters and cable hanger assemblies improve upon the conventional cable hanger assemblies by eliminating the known sources of PIM interference created by cable hanger assemblies in the potential PIM reactive zones near cellular base station antennas. Embodiments of the invention may be utilized in concert with other techniques to reduce PIM at cellular base stations, such as the low-PIM cable bracket described in commonly owned U.S. Patent Pub. No. 20190390797, the low-PIM stackable cable hanger described in commonly owned U.S. Patent Pub. No. 20200099212, the low-PIM cable hanger spacer described in commonly owned U.S. patent application Ser. No. 16/591,703, the low-PIM universal mount described in commonly owned U.S. patent application Ser. No. 16/599,647, and the low-PIM cable rail system described in U.S. patent application Ser. No. 16/780,051, which are incorporated by reference.

While the low-PIM angle adapters and cable hanger assemblies can be utilized in any desired location, they are effective for mitigating PIM interference when deployed in the potential PIM reactive zone near a base station antenna. Although PIM generation is a function of the antenna broadcast frequency and power, equipment specifications may use a standard distance, such as 10-feet from the antenna, to establish the potential PIM reactive zone where PIM mitigation is considered to be appropriate. In other cases, the potential PIM reactive zone may be defined relative to the wavelength of the antenna's operational frequency, such as within one or two wavelengths of the downlink (main beam) frequency channel of the antenna.

The cables extending from the base station antenna and associated equipment are typically routed and secured to mounting structures in the potential PIM reactive zone. Even though the cables are typically routed behind the main beam of the antenna, enough RF energy can be present in this region to excite non-linear objects and generate PIM interference. For this reason, all directions from the base station within a standard distance, such as 10-feet from the antenna, may be considered to be within the potential PIM reactive zone. In conventional cell sites, metal cable hangers and associated hardware for supporting RF, optical, ground and remote electrical tilt ("RET") cables located in the potential PIM reactive zone behind base station antennas are common locations of loose metal-to-metal contact that can generate significant levels of PIM.

Generally described, the innovative angle adapters and cable hanger assemblies exhibit low-PIM performance because the angle adapter is made from or coated with a polymeric material that eliminates points of metal-to-metal contact that can generate PIM. The low-PIM angle adapter includes a box frame integrally formed with a slot frame, where the box frame supports one or more cable support hangers and the slot frame slides onto a support structure to position the angle adapter on a support structure, such as a side of a metal angle support. The low-PIM angle adapter also includes one or more cable tie slots that receive cable ties to secure the angle adapter to the support structure. Various embodiments include differently shaped box frames designed to support one or more cable hangers, such as hex, rectangular, trapezoidal and square box frames. Additional embodiments include different types of cable hangers, such as cable blocks and snap-in style cable hangers. The box frames may include multiple receptacles for receiving multiple cable hangers. Cable blocks and brackets also may be used to connect multiple cable hangers to a single receptacle of the low-PIM angle adapter.

A representative embodiment includes a low-PIM angle adapter fabricated from UV stable, injection molded, glass filled nylon to eliminate metal-to-metal contact between metal support structures and metal cable hangers. The low-PIM angle adapter includes a slot frame that fits tightly over a typical 0.25-inch thick angle support or other support structure to position the angle adapter on the support structure and prevent the adapter from rotating when the attachment hardware is tightened. The low-PIM angle adapter may include molded-in features, such as cable tie slots, to position and locate one or more heavy duty, weather resistant plastic cable ties to firmly secure the angle adapter to the support structure.

In one embodiment, the low-PIM angle adapter includes a hex receptacle that captures a hex nut or bolt head, which is connected to the threaded rod that connects the angle adapter to a cable hanger, such as multi-cable block or a bracket that carries multiple snap-in type cable hangers. In another embodiment, the low-PIM angle adapter includes a box frame with one or more molded-in receptacle holes to accept snap-in type cable hangers. For example, a rectangular box frame may include one receptacle, a trapezoidal box frame may include three receptacles, and a square box frame may include three or more receptacles. In the illustrative embodiments described below, the angle adapters are unitary polymeric structures with box frames integrally formed with slot frames. The angle adapters may be fabricated, for example, from injection molded, glass filled nylon. The angle adapters may alternatively be fabricated from other suitable polymeric materials, such as ASB (acrylonitrile butadiene styrene), Acetal or POM (polyoxymethylene), PC (polycarbonate), PVC (polyvinyl chloride), and the like. Alternatively, a metal adapter body may be coated with a suitable polymeric material, such as PVC, natural or synthetic rubber, urethane, acrylic, epoxy, or the like. The angle adapters are also amenable to other suitable fabrication processes, such as compression molding, 3D printing, and so forth.

Figure 3A:
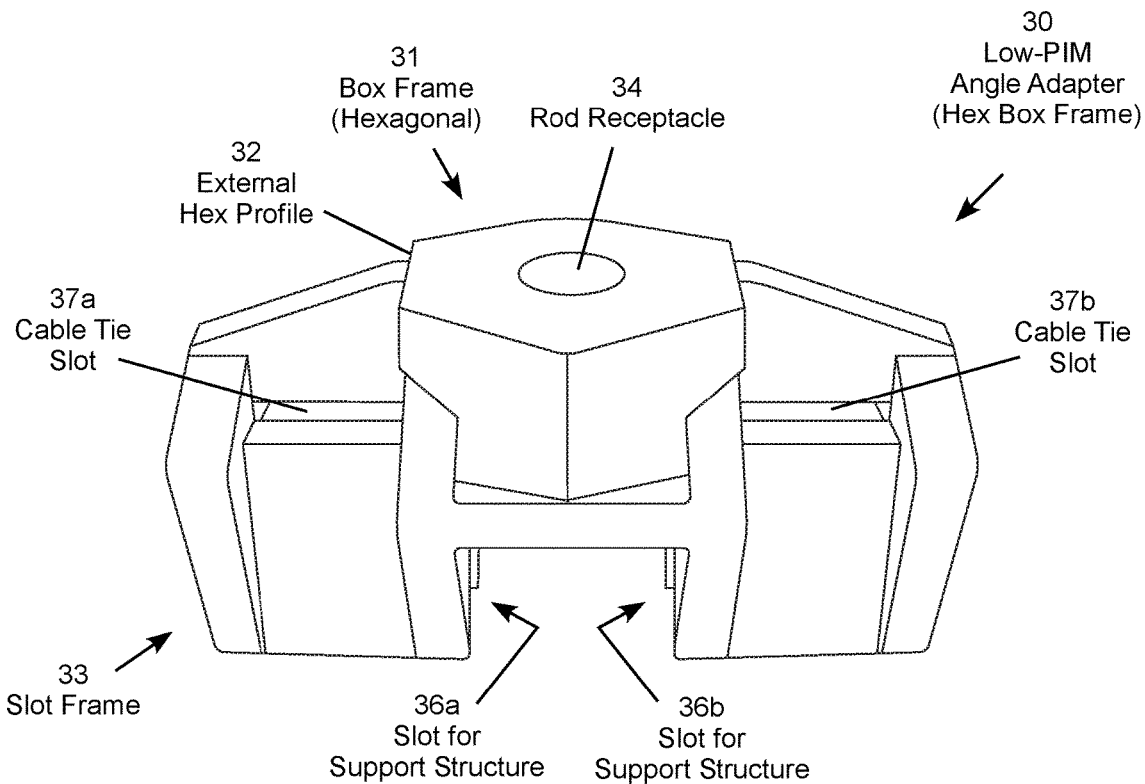
FIG. 3A is a perspective view of a low-PIM angle adapter with a hex box frame according to an embodiment of the invention.
Figure 3B:
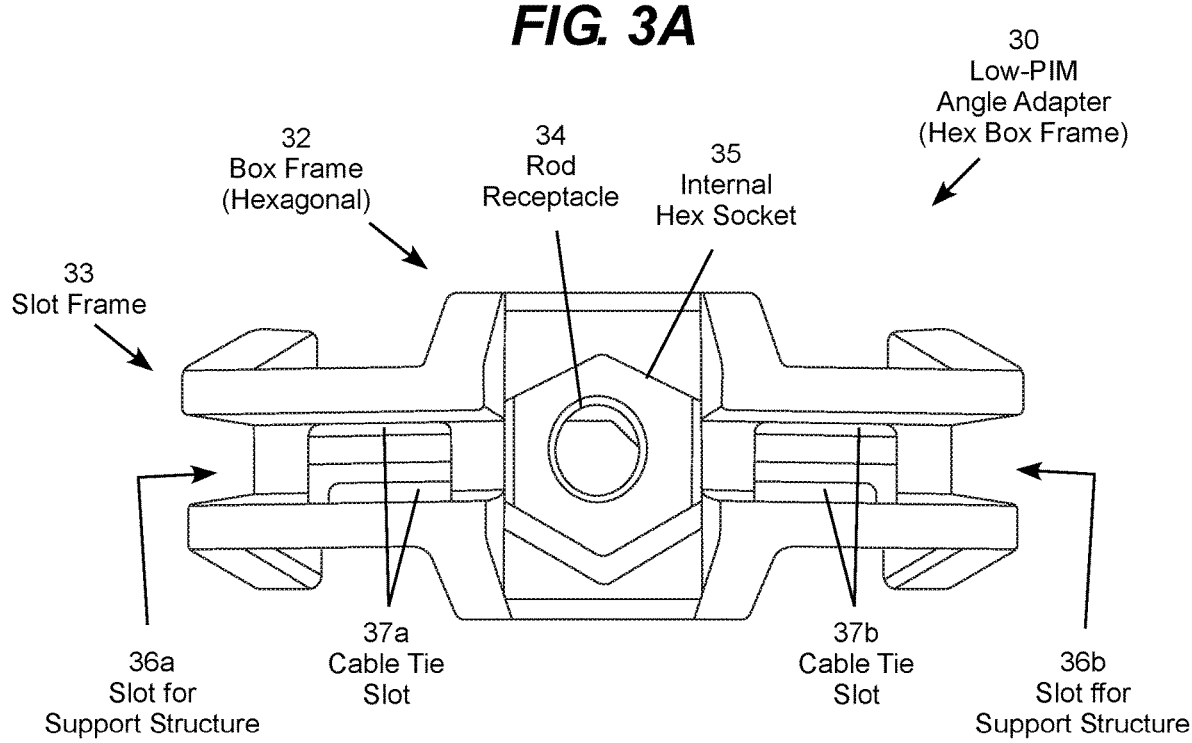
FIG. 3B is a bottom view of the low-PIM angle adapter with the hex box frame.

FIG. 3A is a perspective view and FIG. 3B is a bottom view of a low-PIM angle adapter 30 that includes a hexagonal box frame 31 with an external hex profile 32 integrally formed with a slot frame 33. The box frame 31 also includes a rod receiver 34 that leads to an internal hex socket 35 shaped to capture a hex bolt head or nut connected to a threaded rod that extends through the rod receiver 34. The external hex profile 32 allows a technician to stabilize the angle adapter 30 with a wrench when tightening a compression nut threaded on the rod with a portion of the angle adapter secured between the compression nut and the hex bolt or nut captured in the hex socket 35. The slot frame 33 defines a pair of slots 36a-b for positioning the angle adapter 30 on a support structure, such as an angle support or other flange. In addition, a pair of cable tie slots 37a-b located between the hexagonal box frame 31 and the slot frame 33 are configured to receive a pair of heavy duty cable ties that are used to firmly secure the angle adapter 30 to the support structure.

Figure 4:
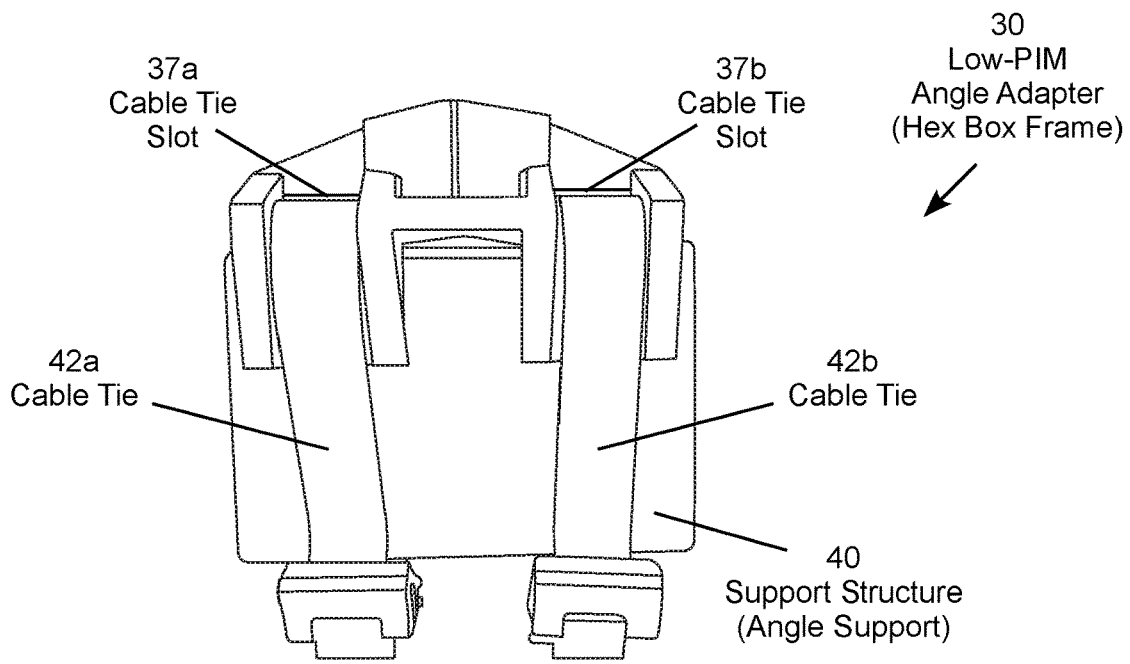
FIG. 4 is a side view of the low-PIM angle adapter with the hex box frame.
Figure 5:
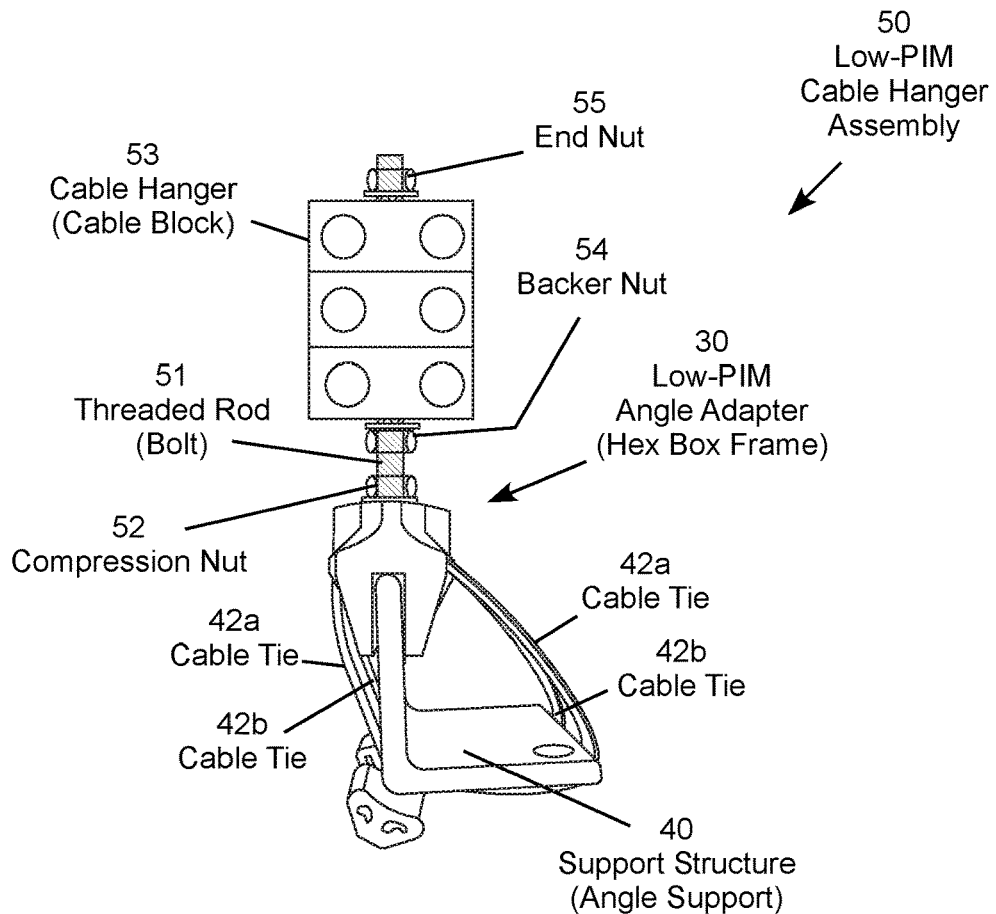
FIG. 5 is an end view of a first type of low-PIM cable hanger assembly including the low-PIM angle adapter with the hex box frame.
Figure 6:
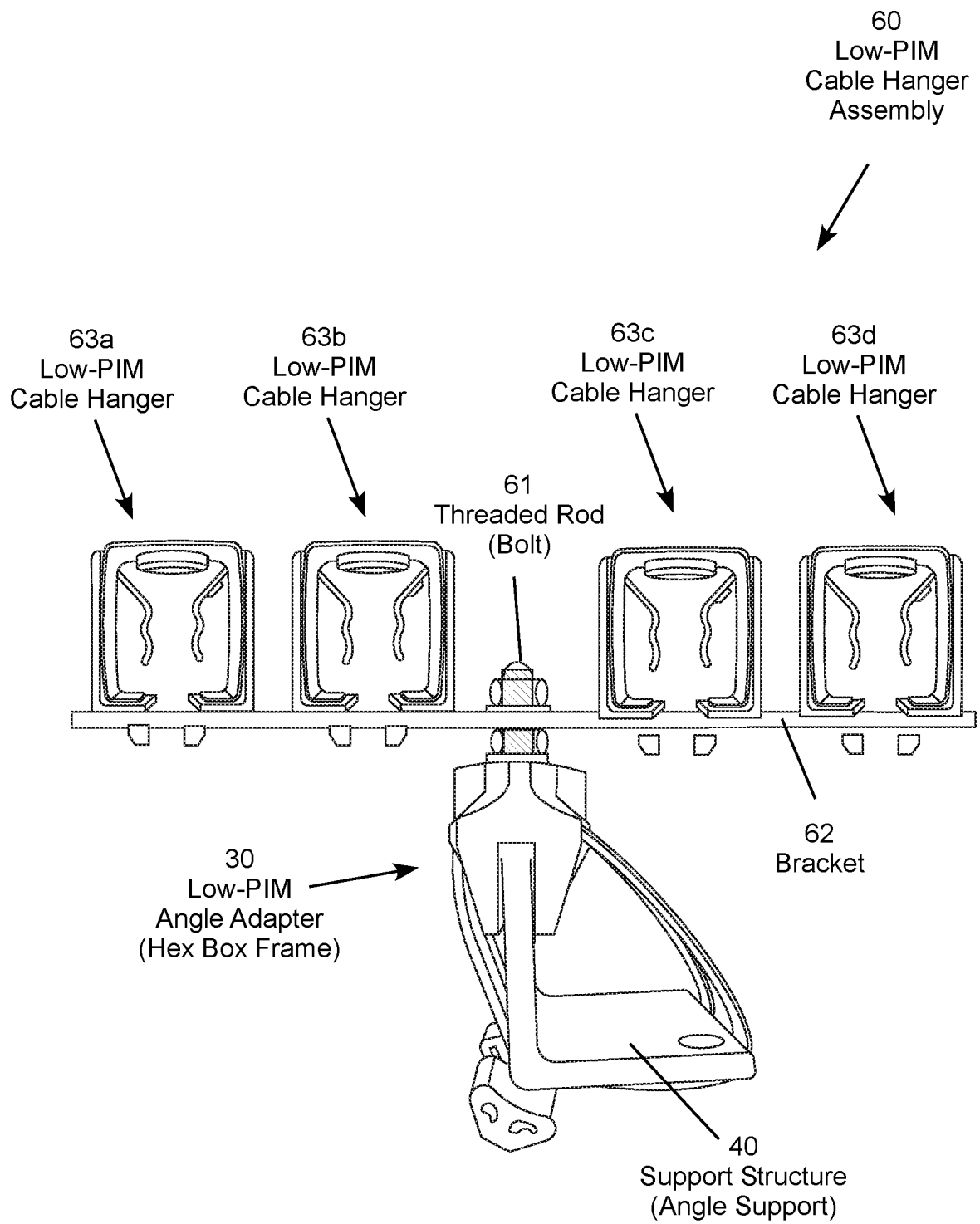
FIG. 6 is an end view of a second type of low-PIM cable hanger assembly including the low-PIM angle adapter with the hex box frame.

FIG. 4 is a side view of the low-PIM angle adapter 30 along with a pair of heavy duty cable ties 42a-b extending through the cable tie slots 37a-b firmly securing the angle adapter 30 to the support structure 40, such as a side of the angle support or other flange. FIG. 5 is an end view of a first type of low-PIM cable hanger assembly 50 including the low-PIM angle adapter 30 engaged with the support structure 40. A threaded rod 51 extends from a hex bolt head or nut captured in the internal hex socket of the angle adapter 30, which is secured to the angle adapter by a compression nut 52. A multi-cable polymeric cable block type cable hanger 53 is also secured the threaded rod between a backer nut 54 and an end nut 55. Although the cable block style cable hanger 53 is secured on the rod spaced apart from the angle adapter 30 in this example, it may be positioned adjacent to the angle adapter if desired. In addition, multiple cable blocks and other types of cable hangers and hanger brackets be can be attached to the same threaded rod in this manner. For example, FIG. 6 is an end view of a second type of low-PIM cable hanger assembly 60, which includes a shorter threaded rod 61 that secures the angle adapter to a bracket 62 that defines a number of receptacle holes that each carry a respective snap-in type low-PIM cable hanger 63a-d. Since the bracket 62 is metal in this example, the low-PIM cable hangers 63a-d include polymeric sides and snap-in feet as described in U.S. Patent Pub. No. 20200099212. Alternatively the bracket 62 may be polymeric or low-PIM polymeric cable hanger spacers may utilized as described in U.S. patent application Ser. No. 16/591,703.

Figure 7A:
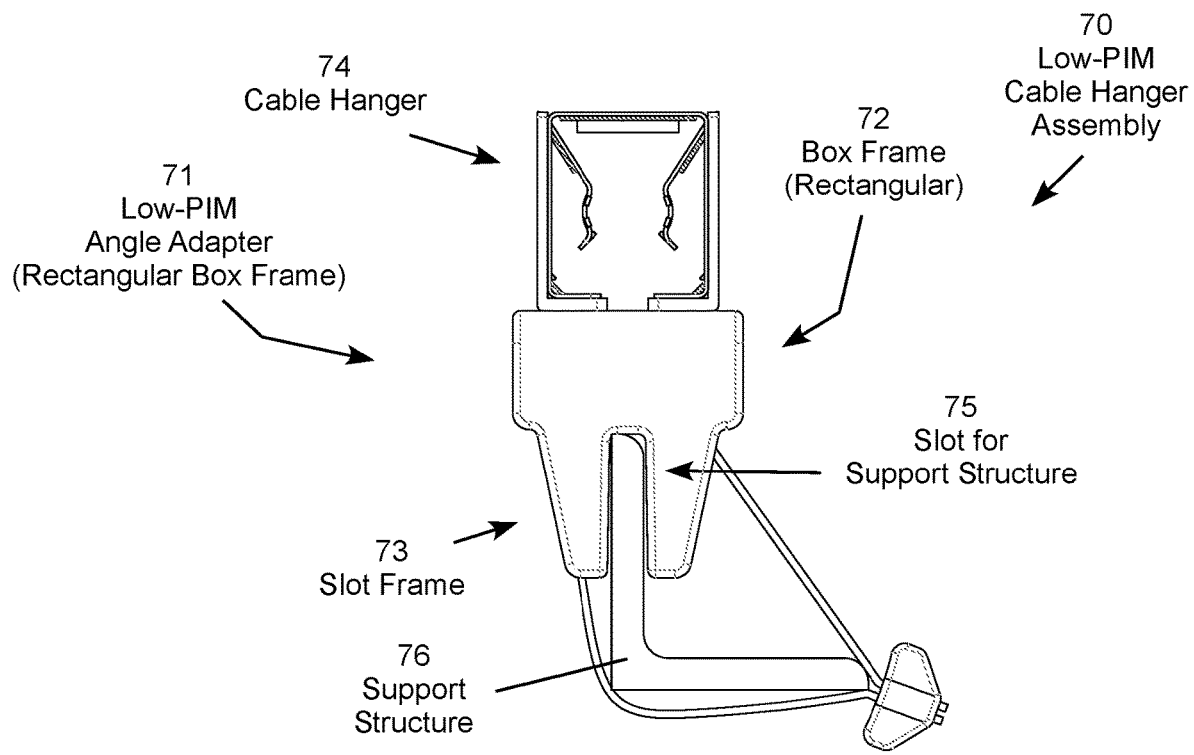
FIG. 7A is an end view of a low-PIM cable hanger assembly including a low-PIM angle adapter with a rectangular box frame according to another embodiment of the invention.
Figure 7B:
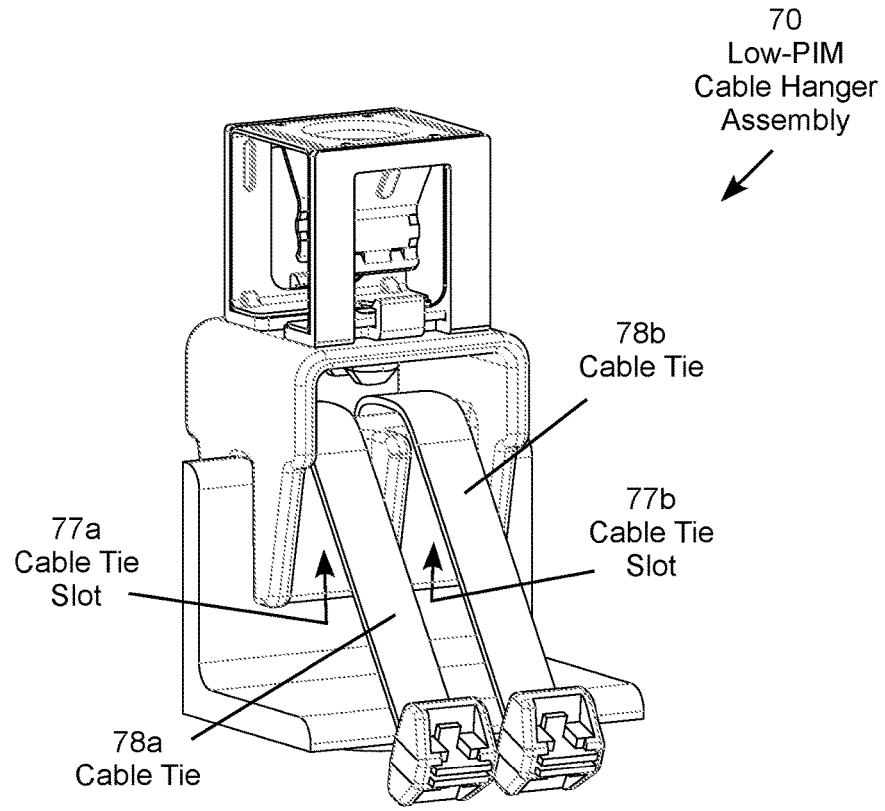
FIG. 7B is a perspective view of the low-PIM cable hanger assembly including the low-PIM angle adapter with the rectangular box frame.

FIG. 7A is an end view and FIG. 7B is a perspective view of a low-PIM cable hanger assembly 70, which includes an alternative low-PIM angle adapter 71 with a rectangular box frame 72 integrally formed with a slot frame 73. In this example, the rectangular box frame 72 includes a single receptacle hole that receives a snap-in type cable hanger 74. Since the box frame 72 is polymeric in this example, the cable hanger 74 may be metal. The slot frame 73 defines a slot 75 for positioning the angle adapter 71 on a support structure 76, in this example an angle support. The angle adapter 71 also includes a pair of cable tie slots 77a-b receiving heavy duty cable ties 78a-b securing the angle adapter to the support structure 76. The slot frame 73 typically includes a second pair of cable tie slots on the other side of the slot frame so that a pair of cable ties can be used to firmly secure the angle adapter 71 to the support structure.

Figure 8A:
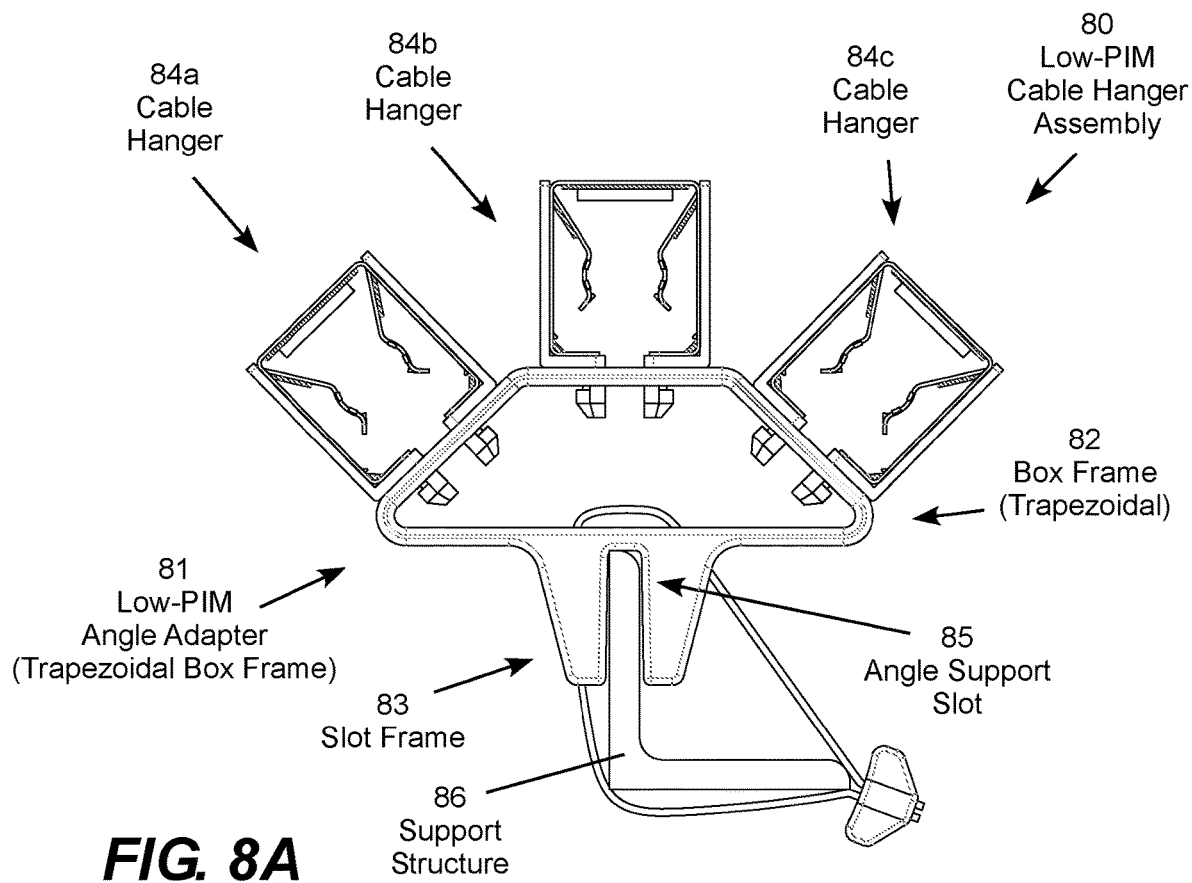
FIG. 8A is an end view of a low-PIM cable hanger assembly including a low-PIM angle adapter with a trapezoidal box frame according to yet another embodiment of the invention.
Figure 8B:
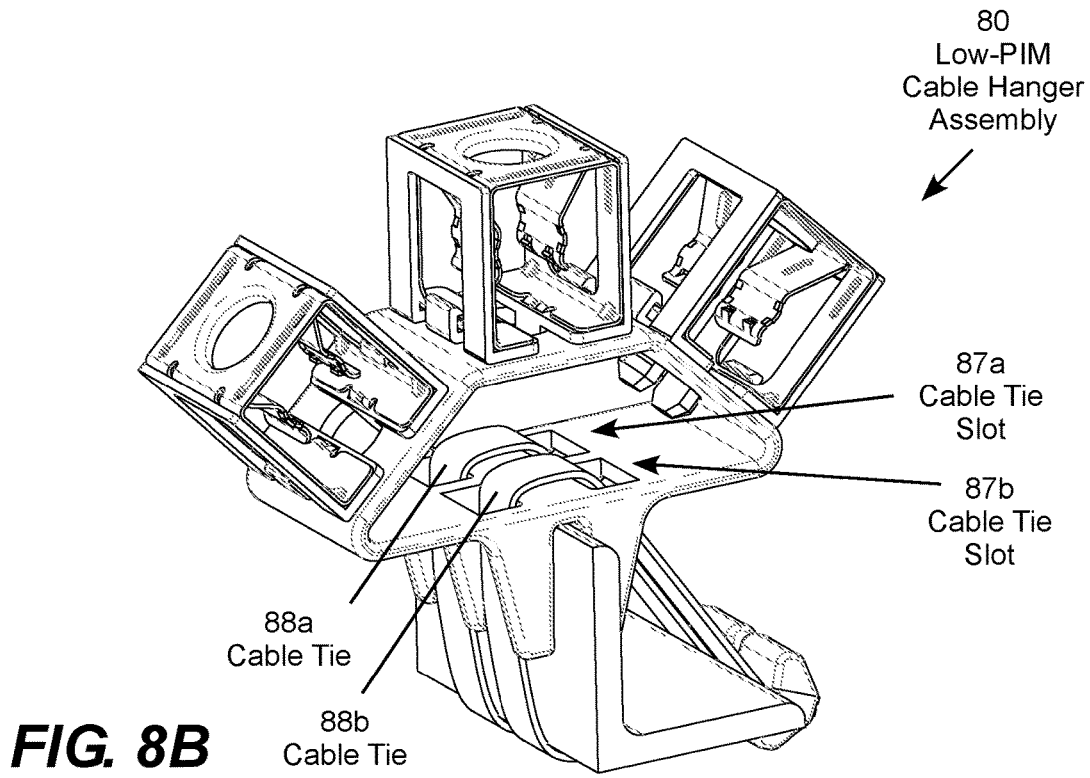
FIG. 8B is a perspective view of the low-PIM cable hanger assembly including the low-PIM angle adapter with the trapezoidal box frame.

FIG. 8A is an end view and FIG. 8B is a perspective view of a low-PIM cable hanger assembly 80, which includes an alternative low-PIM angle adapter 81 with a trapezoidal box frame 82 integrally formed with a slot frame 83. In this example, the trapezoidal box frame 82 includes three upper faces that each define a receptacle hole that receives a respective one of the snap-in type cable hangers 84a-c. Since the box frame 82 is polymeric in this example, the cable hangers 84a-c may be metal. The slot frame 83 defines a slot 85 for positioning the angle adapter 81 on the support structure 86, in this example an angle support. The angle adapter 81 also includes a pair of cable tie slots 87a-b receiving heavy duty cable ties 88a-b securing the angle adapter 81 to the support structure 86.

Figure 9:
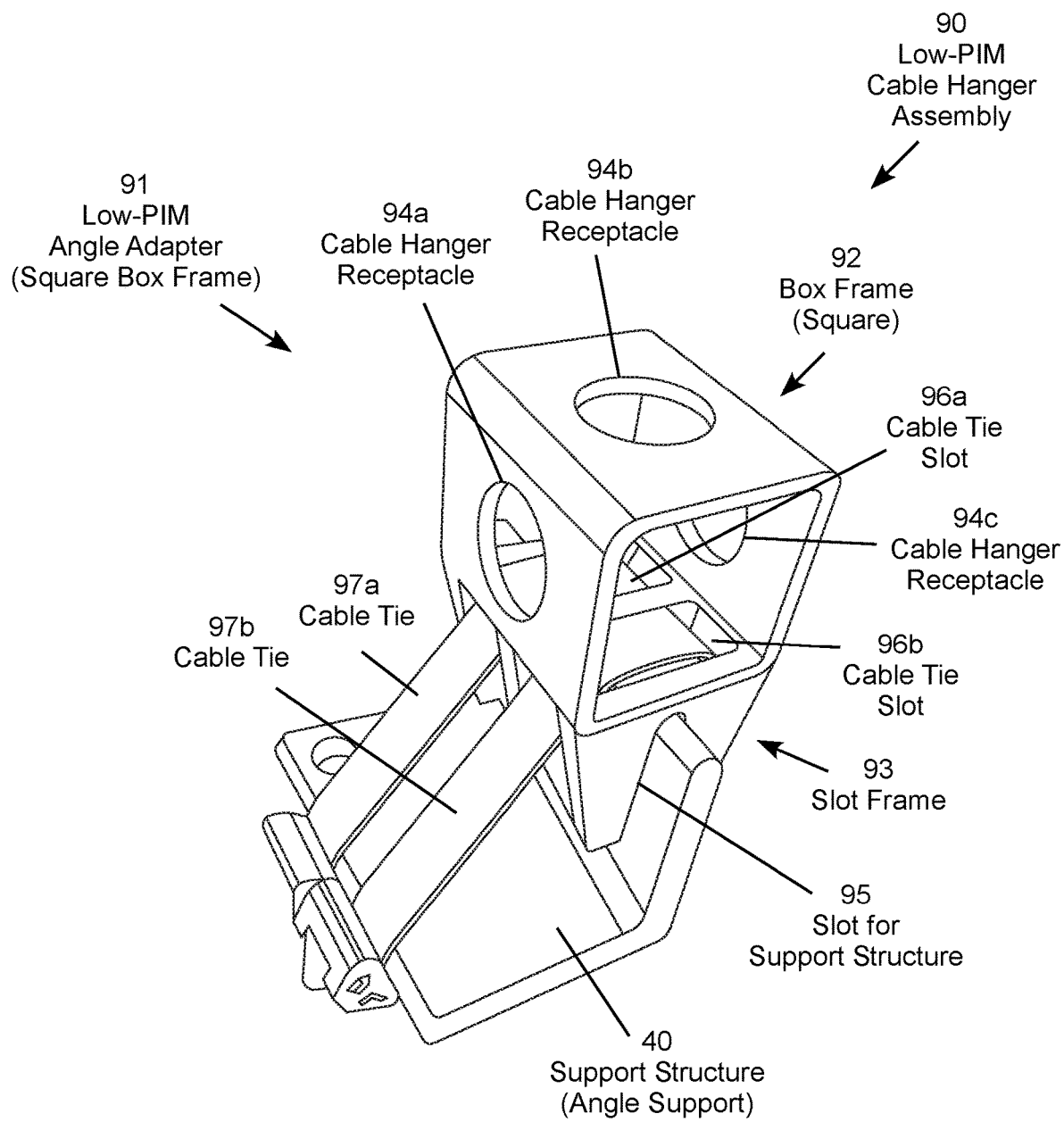
FIG. 9 is an perspective view of a low-PIM cable hanger assembly including a low-PIM angle adapter with a square box frame according to yet another embodiment of the invention.
Figure 10A:
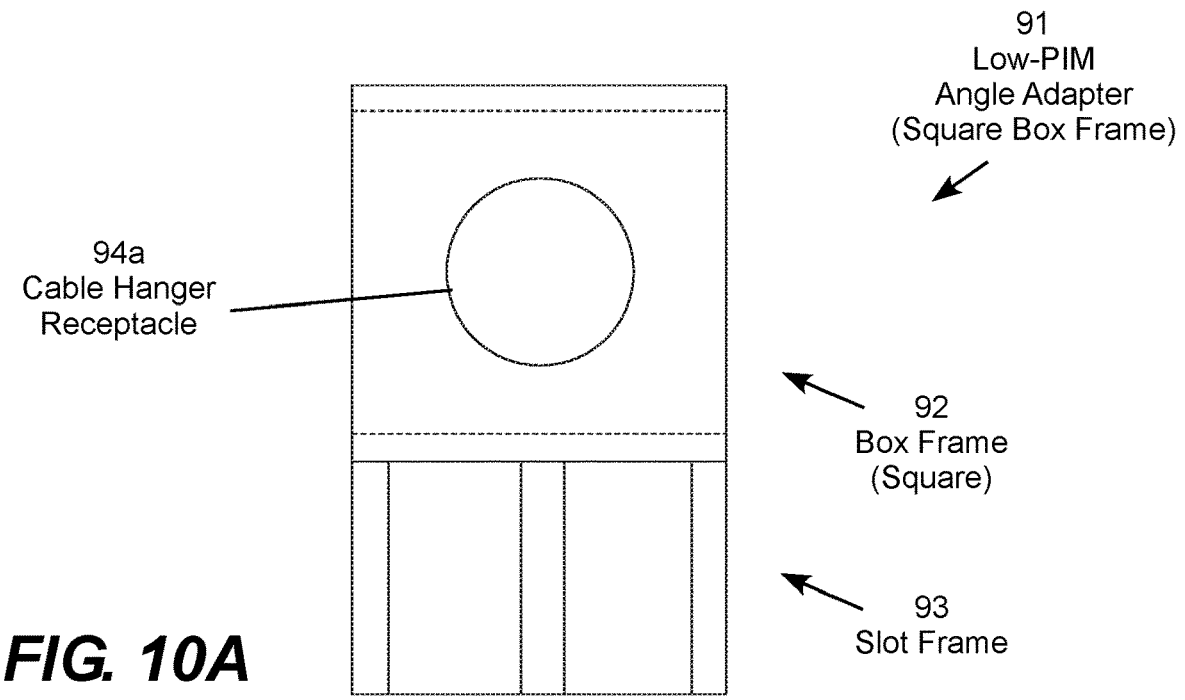
FIG. 10A is a side view of the low-PIM angle adapter with the square box frame.
Figure 10B:
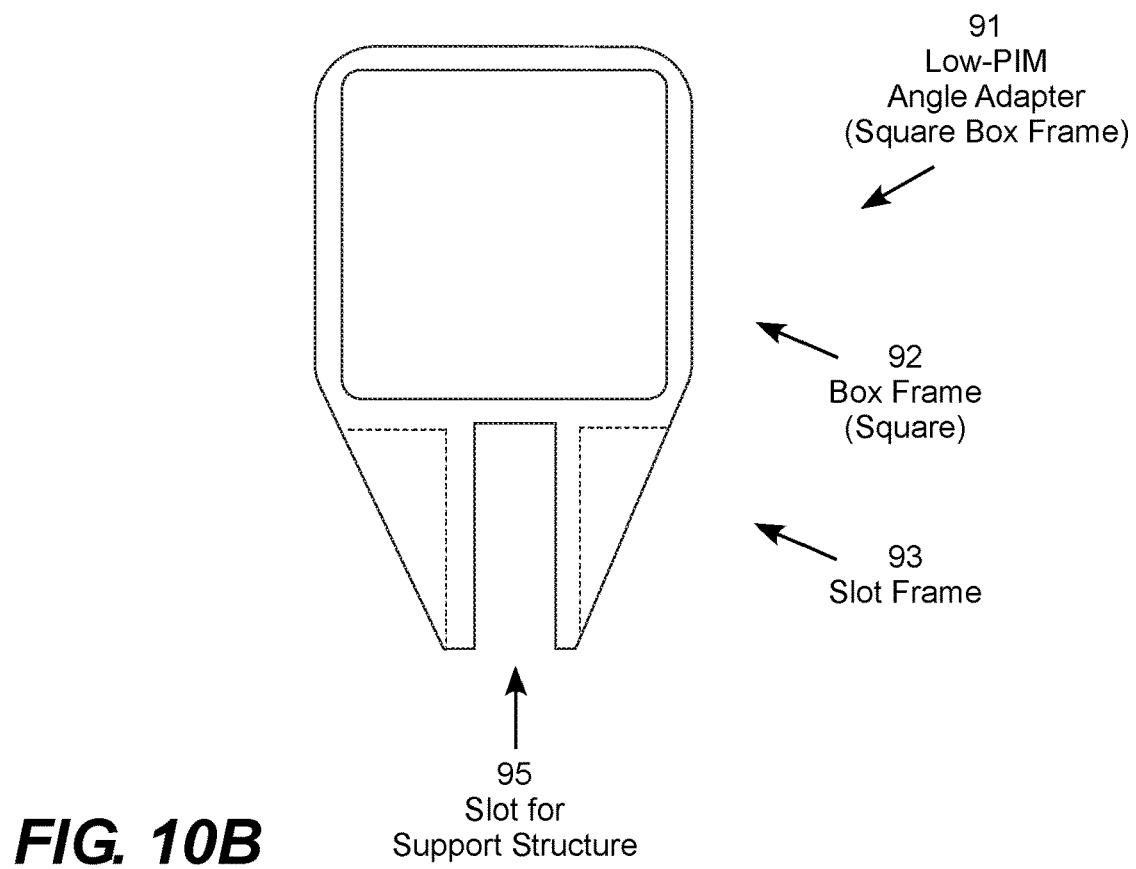
FIG. 10B is an end view of the low-PIM angle adapter with the square box frame.

FIG. 9 is an perspective view of low-PIM cable hanger assembly 90, which includes an alternative low-PIM angle adapter 91 with a square box frame 92 integrally formed with a slot frame 93. FIG. 10A shows a side view and FIG. 10B shows an end view of the low-PIM angle adapter 91. In this example, the square box frame 92 includes three upper faces that each define a respective one of the receptacle holes 94a-c, which are each configured to receive a snap-in type cable hanger. The slot frame 93 defines a slot 95 for positioning the angle adapter 91 on a support structure, such as an angle support or other flange. Since the box frame 92 is polymeric in this example, the cable hangers may be metal. In this embodiment, a bottom side of the square box frame defines a pair of cable tie slots 96a-b that each receive a respective one of the cable ties 97a-b firmly securing the angle adapter 91 on the support structure 40. In alternative embodiments, the square box frame 92 may be enlarged or elongated into a rectangular shape to include receptacle holes for receiving additional cable hangers.

Figure 11:
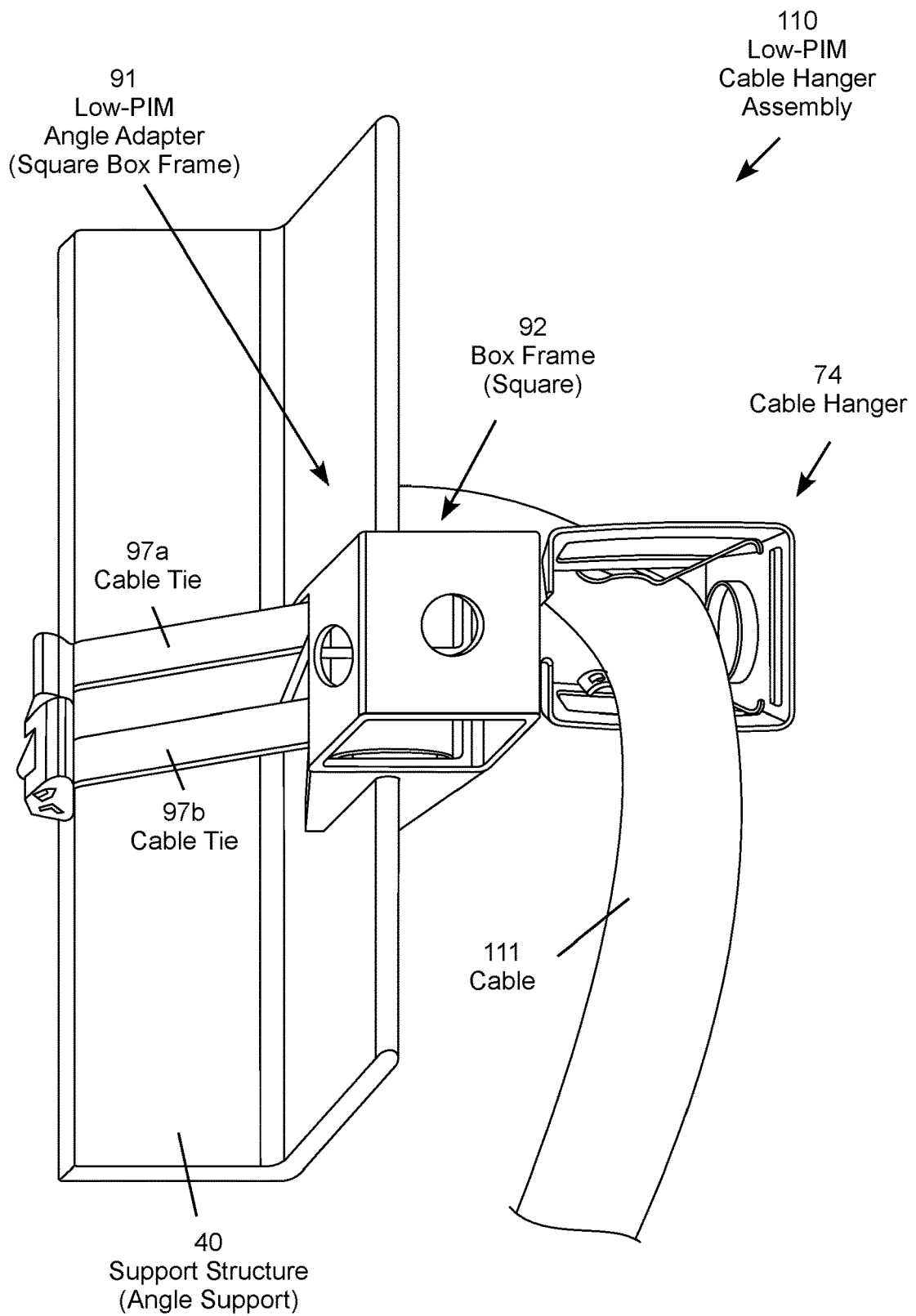
FIG. 11 is a perspective view of a low-PIM cable hanger assembly including the low-PIM angle adapter with the square box frame.
Figure 12:
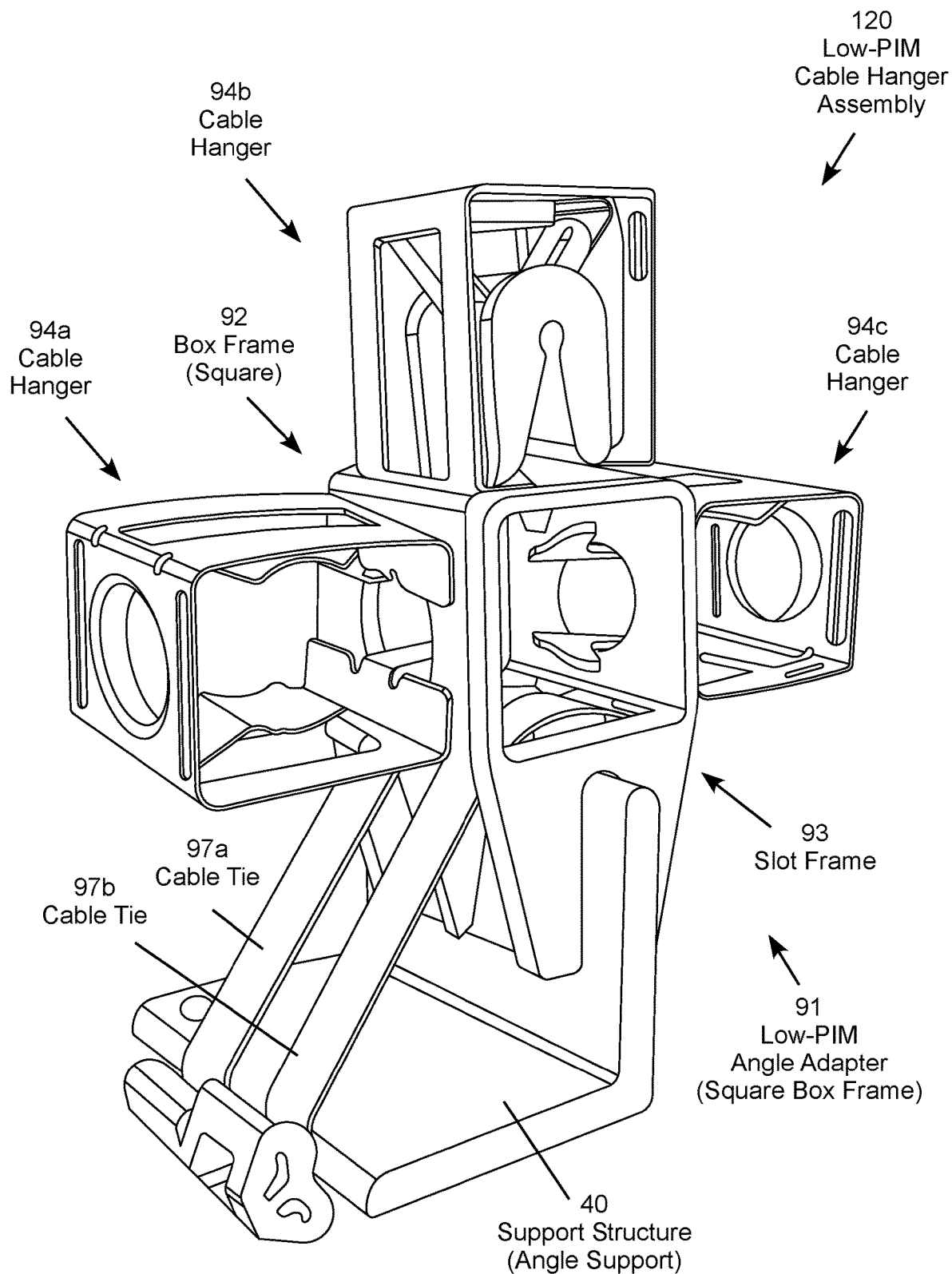
FIG. 12 is a perspective view of another low-PIM cable hanger assembly including the low-PIM angle adapter with the square box frame.

FIG. 11 is a perspective view of a low-PIM cable hanger assembly 110 including the low-PIM angle adapter 91 with a square box frame. This view shows a metal cable hanger 74 snapped into a receptacle hole of the square box frame 92 of the angle adapter 91 supporting a cable 111 routed through the cable hanger. The polymeric angle adapter 91 avoids metal-to-metal contact between the metal cable hanger 74 and the metal support structure 40. FIG. 12 is a perspective view of the low-PIM angle adapter 91 with cable hangers 74a-c received in respective receptacle holes of the square box frame 92 of the angle adapter 91.

Figure 13A:
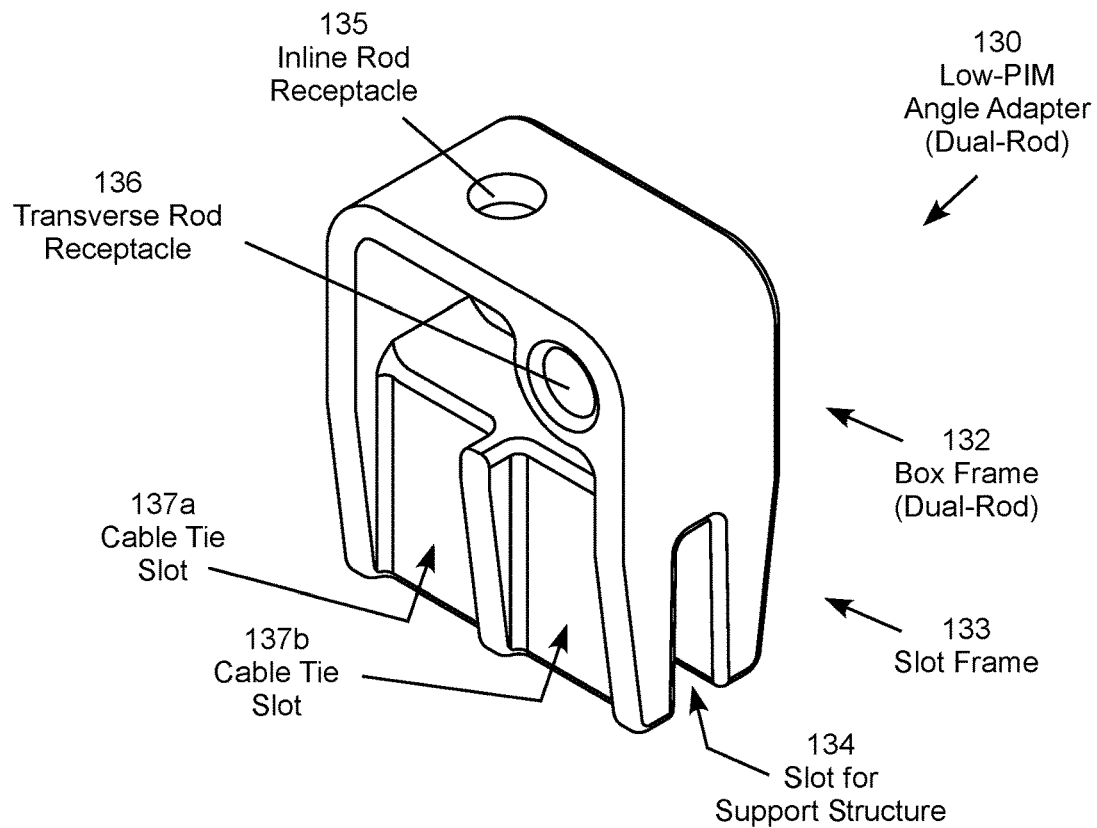
FIG. 13A is a perspective view of a low-PIM angle adapter with a dual-rod box frame according to yet another embodiment of the invention.
Figure 13B:
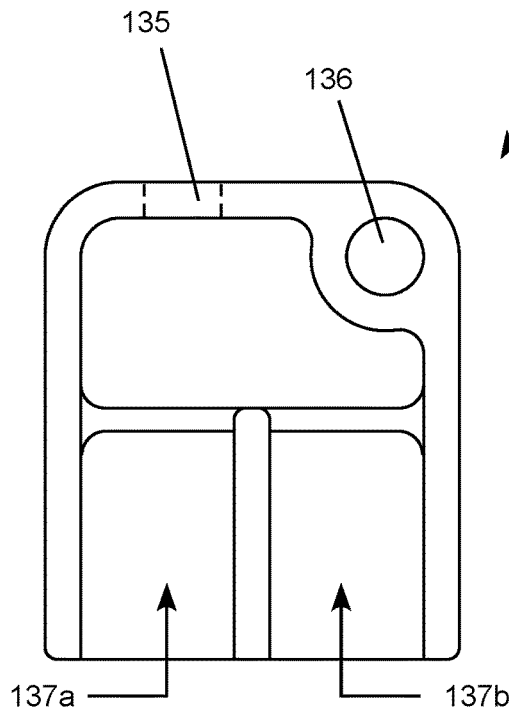
FIG. 13B is a front view of the low-PIM angle adapter with the dual-rod box frame.
Figure 13C:
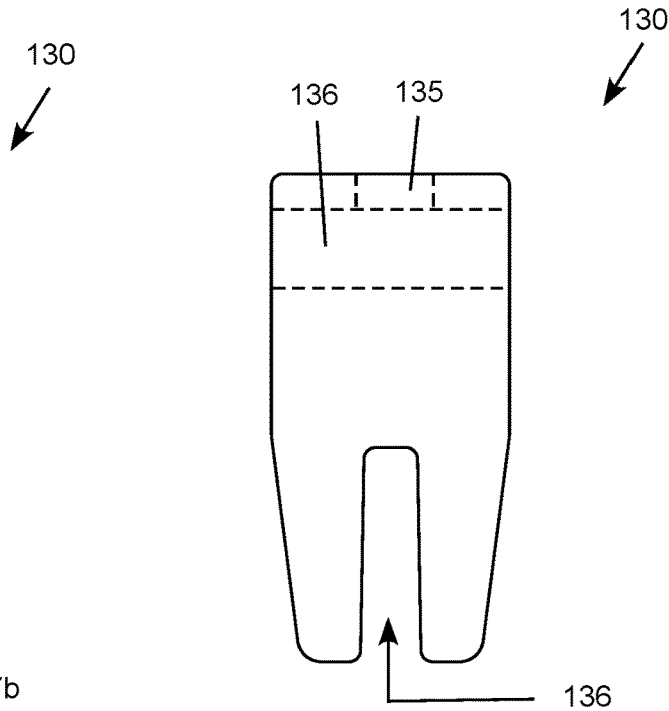
FIG. 13C is a side view of the low-PIM angle adapter with the dual-rod box frame.
Figure 14A:
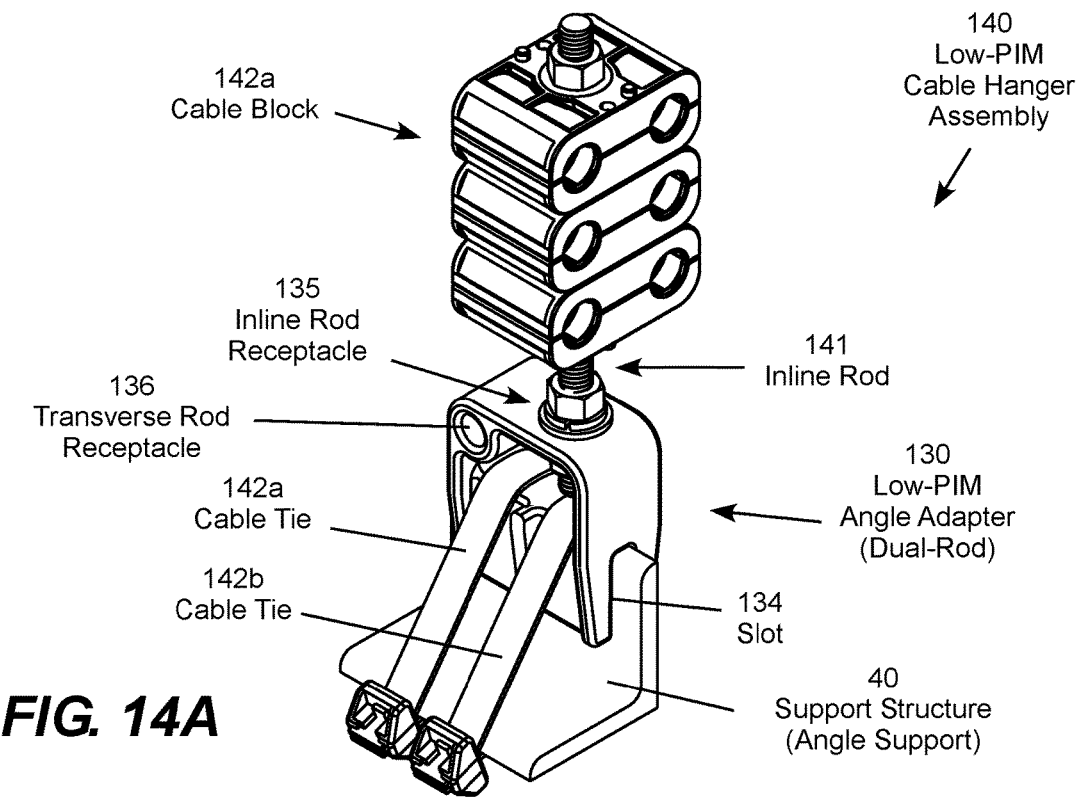
FIG. 14A is a perspective view of a first low-PIM cable hanger assembly including the low-PIM angle adapter with the dual-rod box frame.
Figure 14B:
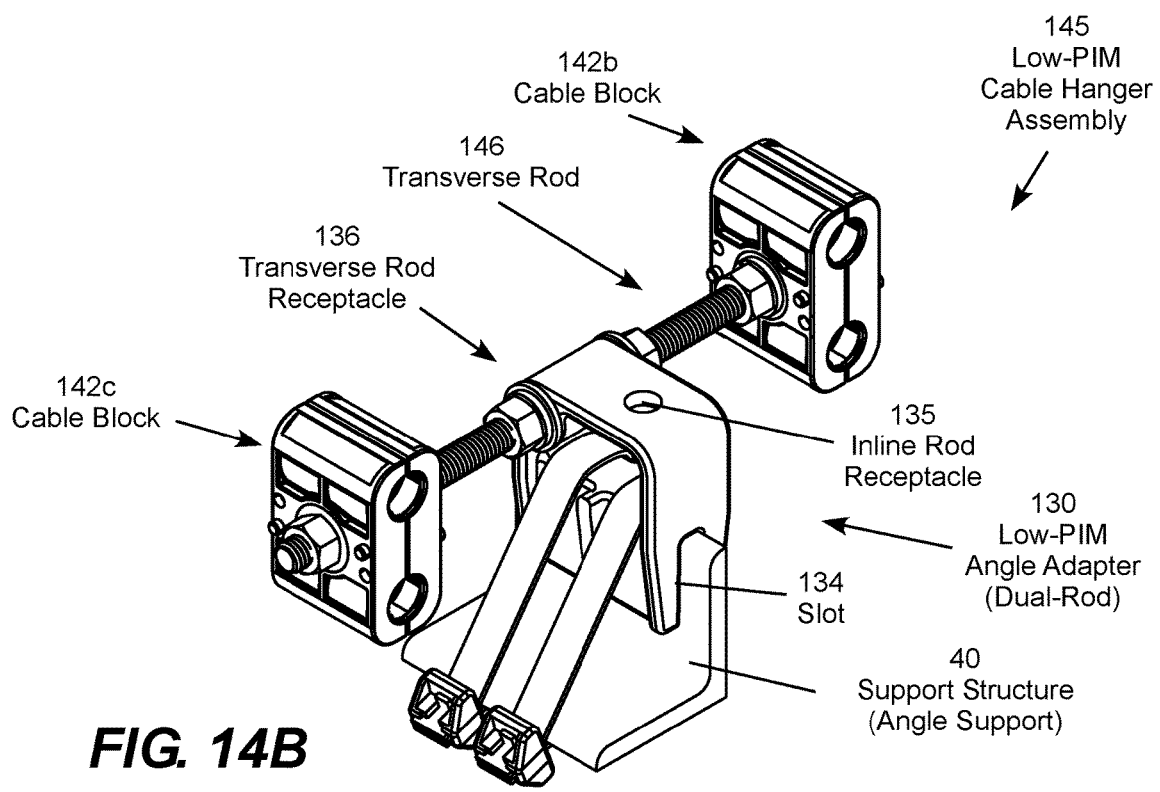
FIG. 14B is a perspective view of a second low-PIM cable hanger assembly including the low-PIM angle adapter with the dual-rod box frame.

FIG. 13A is a perspective view, FIG. 13B is a front view, and FIG. 13C is a side view of a low-PIM angle adapter 130 with a dual-rod box frame 132 and a slot frame 133 defining a slot 134 for receiving a support structure, such as an angle support, flange, frame or other suitable structure. The dual-rod box frame 132 includes an inline receptacle 135 (first receptacle) for receiving a rod inline with the slot 134 (first rod), as well as a transverse receptacle 136 (second receptacle) for receiving a rod transverse to the slot 134 (second rod). Each rod can be connected to single or multiple cable hangers. The dual-rod box frame 132 also includes a pair of cable tie slots 137a-b for receiving heavy-duty cable ties 142a and 142b for securing the angle adapter 130 to the support structure 40 as shown in FIGS. 14A-14B, For example, FIG. 14A is a perspective view of a first low-PIM cable hanger assembly 140 including the low-PIM angle adapter 130 with an inline rod 141 connected to the inline receptacle 135. The inline rod 141, in turn, is connected to a cable block 142a, in this example a 6-cable block for supporting cables extending through the block transverse to the inline rod 141, which orients the cables transverse to the slot 134. The low-PIM cable hanger assembly 140 also includes cable ties 142a-b attaching the low-PIM angle adapter 130 to the support structure 40, in this example an angle support. As another example, FIG. 14B is a perspective view of a second low-PIM cable hanger assembly 145 including the low-PIM angle adapter 130 with a transverse rod 146 connected to the transverse receptacle 136. The transverse rod 146, in turn, is connected to two cable blocks 142b and 142c on opposing ends of the transverse rod. In this example, the cable blocks 142b and 142c are each 4-cable blocks for supporting cables extending through the block transverse to the transverse rod 146, which orients the cables inline with the slot 134.

Figure 15A:
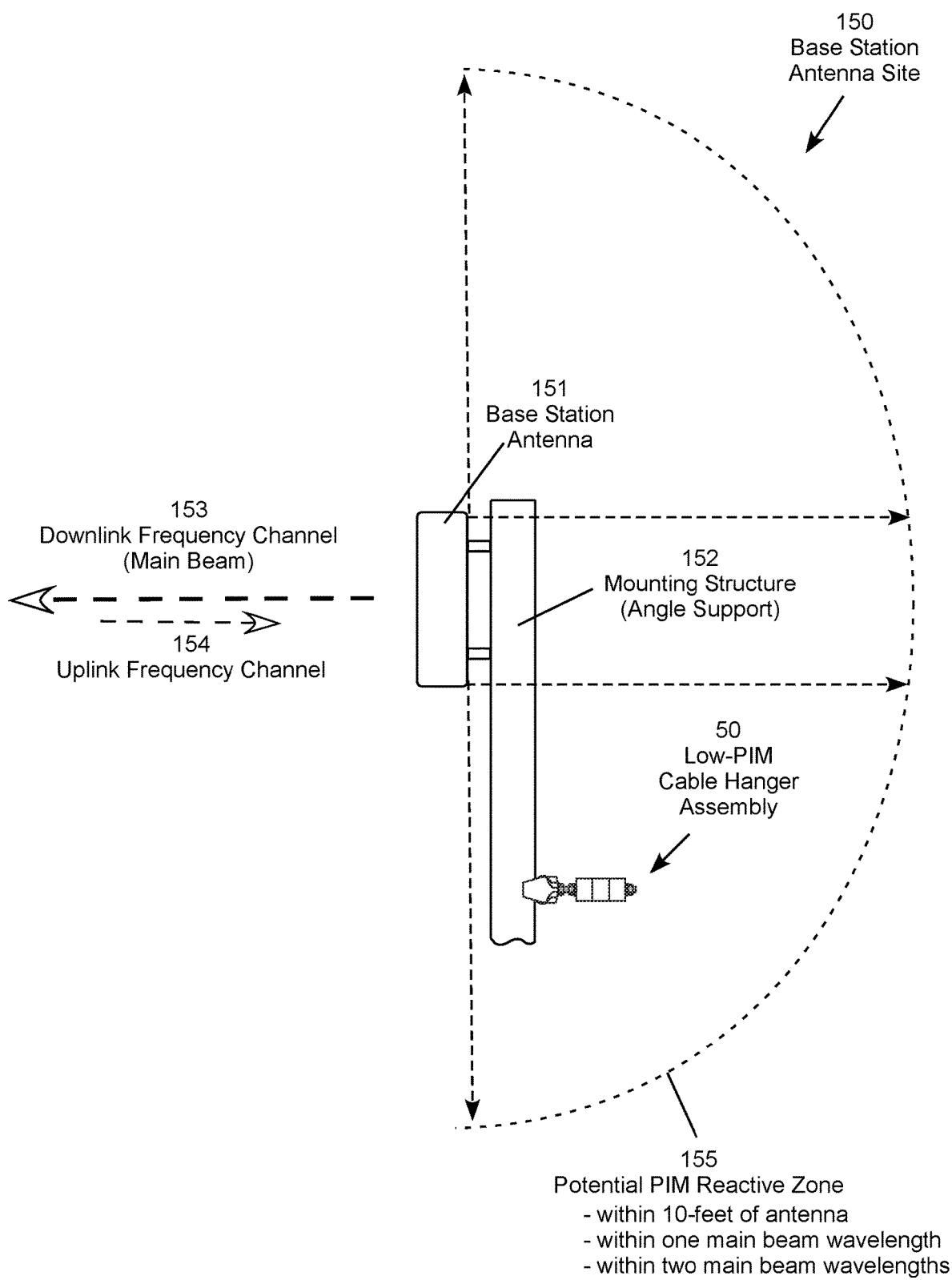
FIG. 15A is a conceptual side view of a low-PIM cable hanger assembly positioned within a potential PIM reactive zone of a base station antenna.
Figure 15B:
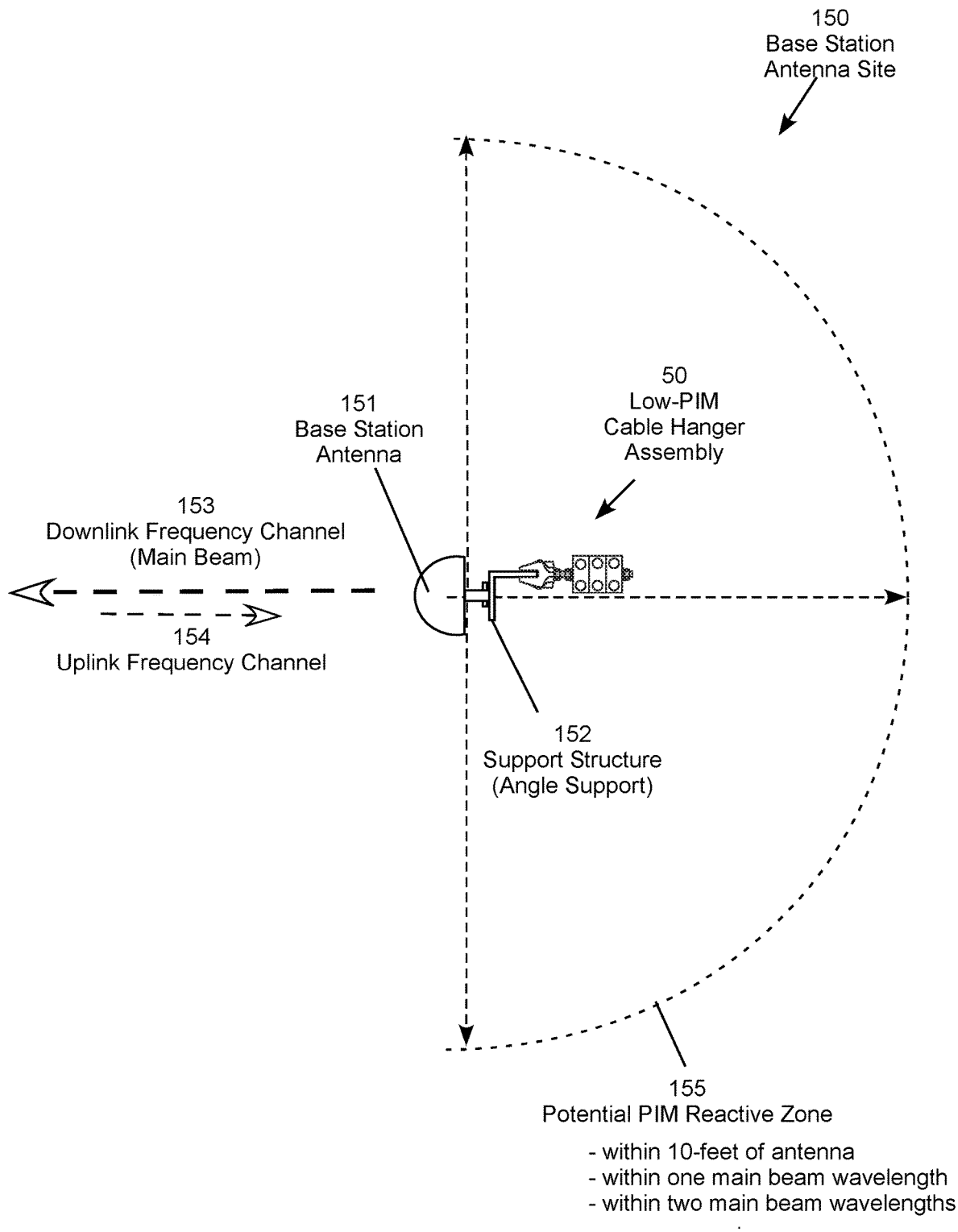
FIG. 15B is a conceptual top view of the low-PIM cable hanger assembly positioned within a potential PIM reactive zone of a base station antenna.

FIG. 15A is a conceptual side view and FIG. 15B is a conceptual top view of a representative base station antenna site 150 that includes a base station antenna 151 supported by a support structure 152. To briefly recap the problem to be solved, the antenna 151 directionally broadcasts higher-power downlink communication signals away from the antenna (generally referred to as the "main beam" of the antenna) within a downlink frequency channel 153 to registered mobile communication devices within the communication reach of the antenna. The antenna 151 also receives lower-power uplink communication signals from the registered mobile communication devices within a separate uplink frequency channel 154 allowing for duplex communications, such as mobile telephone conversations, between the antenna 151 and the registered mobile communication devices within the communication reach of the antenna. Passive intermodulation ("PIM") interference occurs when the downlink signals within the downlink frequency channel 153 mix at nonlinear junctions near the antenna 151 to create noise within the uplink frequency channel 154 received by the antenna. The PIM interference decreases the signal-to-interference plus-noise ratio ("SINR") of the uplink channel of the antenna 151, which reduces the communication quality and information carrying capacity (bandwidth) of the uplink frequency channel.

It is well documented that loosely touching metal-to-metal surfaces can behave in a non-linear fashion and become sources of PIM interference when illuminated by high power RF signals. For this reasons, the coaxial cables and other components associated with operation of the antenna are located well outside and behind the main beam of the antenna. It has recently been determined, however, that loose metal-to-metal connections located behind a base station antenna can generate high levels of passive intermodulation. Even though this region is well outside the main beam of the antenna, enough RF energy can be present in this region to excite non-linear objects and generate PIM interference. Metal brackets and associated hardware for supporting RF, optical, ground and remote electrical tilt ("RET") cables are common sources of loose metal-to-metal contact found in this region behind and close to the base station antenna. Embodiments of the present invention include a range of low-PIM angle adapters and cable hanger assemblies designed to mitigate PIM interference by the equipment used to support the cables and other components associated with the operation of the antenna, which are typically located near the antenna outside the main beam of the antenna.

To develop standards for mitigating PIM, technicians may define a potential PIM reactive zone 155 in which PIM mitigation equipment should be installed. FIGS. 15A-15B illustrate this practice for a representative example base station antenna site 150, in which a representative low-PIM cable hanger assembly 50 is attached to the support structure 152 within a potential PIM reactive zone 155 defined for an antenna 151. In this example, the representative low-PIM cable hanger assembly 50 is located well outside the main beam 153 and physically behind the antenna 151 on the opposite side of the support structure 152 from the antenna. The low-PIM cable hanger assembly 50 is nevertheless specified to provide PIM mitigation because it is still located with the potential PIM reactive zone 155 defined for the antenna 151. The low-PIM cable hanger assembly 50 is representative of the low-PIM cable hanger assemblies generally, as all of the low-PIM cable hanger assemblies described in the disclosure, and variations of these specific examples, are intended for deployment as PIM mitigation measures in the potential PIM reactive zones of cellular base station antennas.

While the low-PIM angle adapters and cable hanger assembly embodiments of the present invention can be utilized in any desired location, they are particularly effective for mitigating PIM interference when deployed in the potential PIM reactive zone 155 near the base station antenna 151. Although PIM generation is a function of the antenna broadcast frequency and power, technicians may use a standard distance, such as 10-feet from the antenna 151, to establish the potential PIM reactive zone 155 where PIM mitigation is appropriate. As other options, the potential PIM reactive zone 155 may be established to be a function of the antenna broadcast frequency, such as one or two wavelengths of the main beam frequency channel 153 of the antenna 151. Other factors, such as the broadcast power of the antenna 151, the presence of reflective surfaces in the physical environment of the antenna, the width of the uplink channel, the use of electronic filtering, and other relevant factors may also be taken into account when establishing the potential PIM reactive zone for a particular antenna. For administrative simplicity, however, the standard set for potential PIM reactive zone 155 may ultimately be defined to be a set distance, such as 10-feet from the antenna.

While particular aspects of the present subject matter have been shown and described in detail, it will be apparent to those skilled in the art that, based upon the teachings of this disclosure, changes and modifications may be made without departing from the subject matter described in this disclosure and its broader aspects and, therefore, the appended claims are to encompass within their scope all such changes and modifications as are within the true spirit and scope of the subject matter described in this disclosure. Although particular embodiments of this disclosure have been illustrated, it is apparent that various modifications and embodiments of the disclosure may be made by those skilled in the art without departing from the scope and spirit of the disclosure.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. The disclosure is defined by the following claims, which should be construed to encompass one or more structures or function of one or more of the illustrative embodiments described above, equivalents and obvious variations. It will therefore be appreciated that the present invention provides significant improvements. The foregoing relates only to the exemplary embodiments of the present invention, and that numerous changes may be made therein without departing from the spirit and scope of the invention as defined by the following claims.

The invention claimed is:

1. A low-PIM angle adapter for attachment to a flange of an angle support, the flange defining a first elongated side facing away from a second elongated side, comprising:
 a box frame integrally formed with a slot frame fabricated from or coated with a polymeric material;
 wherein the box frame comprises one or more rod receivers;
 wherein the slot frame comprises a support slot comprising a first elongated side facing toward a second elongated side;
 the angle adapter further comprising a cable tie securing the angle adapter to the angle support with the support slot straddling the flange with the first elongated side of the slot in contact with the first elongated side of the flange, and with the second elongated side of the slot in contact with the second elongated side of the flange, and with the cable tie extending from the angle adapter around the angle support for set screw free engagement of the angle adapter with the angle support.

2. The low-PIM angle adapter of claim 1, wherein the one or more rod receivers comprises a rod receiver leading to an internal hex socket for capturing a hex bolt head or nut engaged with a rod extending through the rod receiver.

3. The low-PIM angle adapter of claim 2, further comprising an external hex profile for receiving a wrench to facilitate tightening a compression nut threaded on the rod with a portion of the angle adapter secured between the compression nut and the hex bolt or nut captured in the hex socket.

4. The low-PIM angle adapter of claim 3, further comprising a cable block secured on the rod.

5. The low-PIM angle adapter of claim 4, wherein the cable block is secured on the rod spaced apart from the angle adapter.

6. The low-PIM angle adapter of claim 2, further comprising a bracket secured to the rod and one or more cable hangers carried by the bracket.

7. The low-PIM angle adapter of claim 1, wherein the first and second sides of the flange are elongated in a first dimension, and the box frame comprises a first rod receiver for receiving a first rod elongated in the first dimension.

8. The low-PIM angle adapter of claim 1, wherein the box frame comprises a first rod receiver for receiving a first rod, further comprising a second rod receiver for receiving a second rod oriented transverse to the first rod.

9. The low-PIM angle adapter of claim 8, further comprising a first cable block secured to the first rod, further comprising a second cable block secured to the second rod spaced apart from the box frame on a first side of the second rod, further comprising a third cable block secured to the second rod spaced apart from the box frame on a second side of the second rod.

10. The low-PIM angle adapter of claim 1, further comprising positioning the low-PIM angle adapter within a potential PIM reactive zone of a cellular base station antenna.

11. A low-PIM cable hanger assembly, comprising:
 an angle adapter attached to a metal flange of an angle support, the flange defining a first elongated side facing away from a second elongated side, the angle adapter comprising a box frame integrally formed with a slot frame, the slot frame fabricated from or coated with a polymeric material, wherein the box frame comprises one or more rod receivers, wherein the slot frame comprises a support slot comprising a first elongated side facing toward a second elongated side, and the angle adapter further comprising at least one cable tie securing the angle adapter to the angle support with the flange slot straddling the flange with the first elongated side of the slot in contact with the first elongated side of the flange, and with the second elongated side of the slot in contact with the second elongated side of the flange, and with the cable tie extending from the angle adapter around the angle support providing set screw free engagement of the angle adapter with the angle support;
 one or more metal cable hangers, each received on a respective rod received in a respective rod receiver of the angle adapter;

wherein the angle adapter is positioned to prevent metal-to-metal contact between the metal support structure and the one or more metal cable hangers to mitigate passive intermodulation ("PIM") interference when the cable hanger assembly is positioned within a potential PIM reactive zone of a cellular base station antenna.

12. The low-PIM cable hanger assembly of claim 11, wherein the one or more rod receivers comprises a rod receiver leading to an internal hex socket capturing a hex bolt head or nut engaged with a rod extending through the rod receiver.

13. The low-PIM cable hanger assembly of claim 12, further comprising an external hex profile for receiving a wrench to facilitate tightening a compression nut threaded on the rod with a portion of the angle adapter secured between the compression nut and the hex bolt or nut captured in the hex socket.

14. The low-PIM cable hanger assembly of claim 13, further comprising a cable block secured on the rod.

15. The low-PIM cable hanger assembly of claim 14, wherein the cable block is secured on the rod spaced apart from the angle adapter.

16. The low-PIM cable hanger assembly of claim 12, further comprising a bracket secured to the rod and one or more cable hangers carried by the bracket.

17. The low-PIM cable hanger assembly of claim 11, wherein the first and second sides of the flange are elongated in a first dimension, and the box frame comprises a first rod receiver for receiving a first rod elongated in the first dimension.

18. The low-PIM cable hanger assembly of claim 11, wherein the box frame comprises a first rod receiver for receiving a first rod, further comprising a second rod receiver for receiving a second rod oriented transverse to the first rod.

19. The low-PIM cable hanger assembly of claim 18, further comprising a first cable block secured to the first rod, further comprising a second block secured to the second rod spaced apart from the box frame on a first side of the second rod, further comprising a third block secured to the second rod spaced apart from the box frame on a second side of the second rod.

20. A method for mitigating passive intermodulation ("PIM") interference associated with a cellular base station antenna, comprising:

providing an angle adapter attached to a metal flange of an angle support, the flange defining a first elongated side facing away from a second elongated side, the angle adapter comprising a box frame integrally formed with a slot frame, the slot frame fabricated from or coated with a polymeric material, wherein the box frame comprises one or more rod receivers, wherein the slot frame comprises a support slot comprising a first elongated side facing toward a second elongated side, and the angle adapter further comprising at least one cable tie securing the angle adapter to the angle support with the flange slot straddling the flange with the first elongated side of the slot in contact with the first elongated side of the flange, and with the second elongated side of the slot in contact with the second elongated side of the flange, and with the cable tie extending from the angle adapter around the angle support providing set screw free engagement of the angle adapter with the angle support;

providing one or more rods, each received in a respective rod receiver of the angle adapter;

providing one or more cable hangers, each received on a respective rod of the angle adapter;

positioning the angle adapter within a potential PIM reactive zone of the cellular base station antenna to prevent metal-to-metal contact between the metal support structure and the one or more metal cable hangers to mitigate passive intermodulation ("PIM") interference.

\* \* \* \* \*